United States Patent
Wolf et al.

(10) Patent No.: US 10,051,343 B2
(45) Date of Patent: Aug. 14, 2018

(54) MATCH VIDEO MARKING

(71) Applicant: SAP SE, Walldorf (DE)

(72) Inventors: Timo Wolf, Gaiberg (DE); Sergey Puzhevich, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/358,996

(22) Filed: Nov. 22, 2016

(65) Prior Publication Data

US 2018/0146264 A1    May 24, 2018

(51) Int. Cl.
| | |
|---|---|
| *H04N 21/84* | (2011.01) |
| *H04N 21/61* | (2011.01) |
| *H04N 21/234* | (2011.01) |
| *G06T 7/00* | (2017.01) |
| *G06K 9/52* | (2006.01) |
| *G06K 9/62* | (2006.01) |

(52) U.S. Cl.
CPC ............ *H04N 21/84* (2013.01); *G06K 9/52* (2013.01); *G06K 9/6201* (2013.01); *G06T 7/0042* (2013.01); *H04N 21/23418* (2013.01); *H04N 21/6125* (2013.01)

(58) Field of Classification Search
CPC ............... H04N 21/8133; H04N 21/84; H04N 21/23418; H04N 21/6125; G06K 9/52; G06K 9/6201; G06T 7/0042
See application file for complete search history.

(56) References Cited

U.S. PATENT DOCUMENTS

2013/0128034 A1* 5/2013 Carr ................... G06K 9/00771
                                                        348/135
2017/0223430 A1* 8/2017 Kim ..................... H04N 21/812

* cited by examiner

*Primary Examiner* — Hunter B Lonsberry
(74) *Attorney, Agent, or Firm* — Sterne, Kessler, Goldstein & Fox P.L.L.C.

(57) ABSTRACT

Disclosed herein are system, method, and computer program product embodiments for embedding information in a video feed. An embodiment operates by analyzing a video frame from a video feed to detect features of a playing field in the video frame and generate a camera projection matrix based on a model of the playing field and the detected features. Converting positional information associated with players shown in the video feed using the camera projection matrix. Mapping the positional information associated with the players to a display.

15 Claims, 8 Drawing Sheets

MATCH VIDEO MARKING

BACKGROUND

When a user views an event on a display device, such as a television or mobile phone, the user may also desire simultaneously viewing information associated with the event in real time on the same display device. By embedding the viewing information directly into a video of the event, the user can view both the event and the viewing information on the display device. For example, the user may desire to view positional information associated with individuals in the event in order to track where they are over the course of the event. However, there may be issues with correctly mapping the positional information to the viewing information when a camera live-streams the event to the display device. As a result, the user viewing the event may receive inaccurate viewing information.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for determining camera parameters to accurately embed viewing, information into real-time video of an event. For purposes of illustration, the detailed description pertains to determining the camera parameters to embed viewing information into real-time video of a soccer match. However, the detailed description is not so limited and a person skilled in the art will appreciate that determining camera parameters to embed viewing information into a real-time video may be applied to many other events, such as a football game, a basketball game, or a track and field event, to name a few examples. The techniques discussed herein can also be applied in general video surveillance environments where similar data sources are available.

Figure 1:
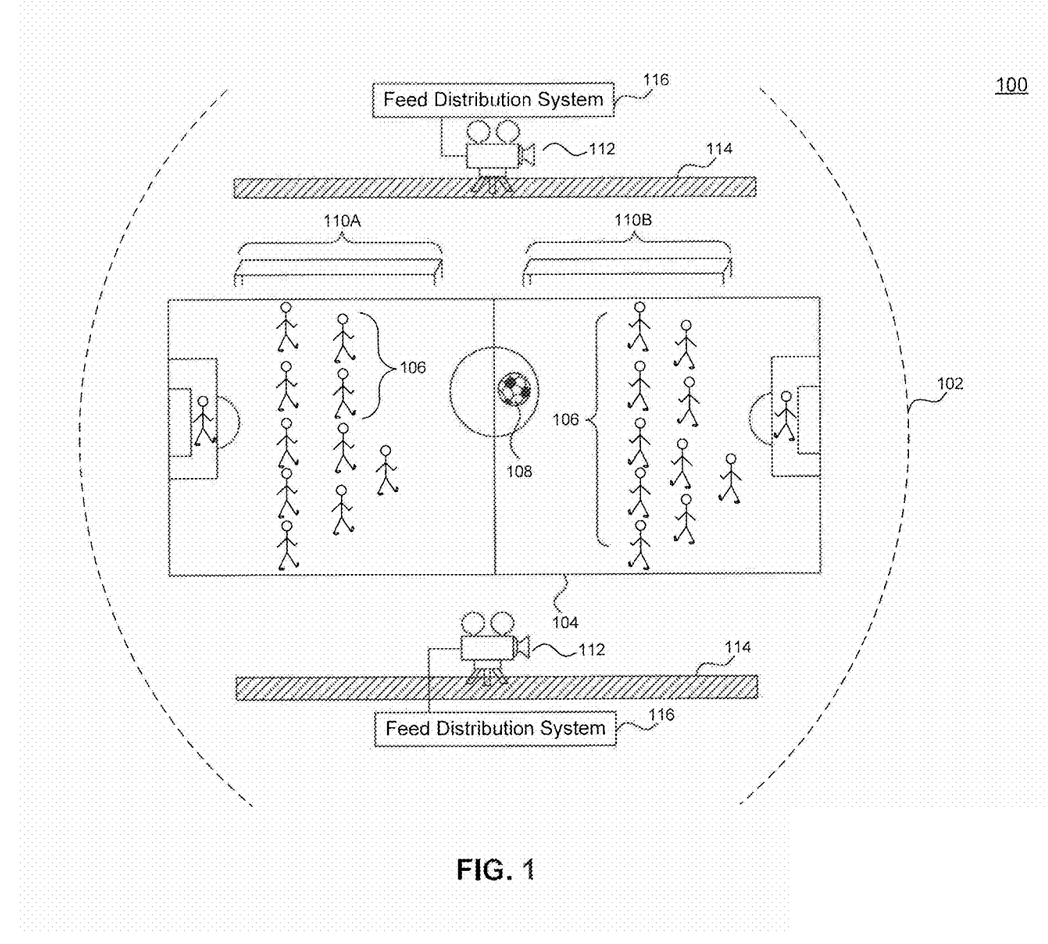
FIG. 1 is a block diagram of a soccer pitch including, a soccer field and video cameras, according to some embodiments.

FIG. 1 is a block diagram of a soccer system 100, according to an embodiment. The soccer system 100 may include a stadium 102 having a soccer pitch 104 where a plurality of soccer players 106 plays a soccer game. For example, the plurality of soccer players 106 may include two separate teams, where each team has 11 players, with 22 players on the soccer pitch 104. The soccer pitch 104, which is a playing field of the soccer system 100, includes a soccer ball 108 used for the soccer game. Each of the separate teams is associated with a bench 110. For example, one team is associated with bench 110A while the opposing team is associated with bench 110B.

In an embodiment, the soccer system 100 includes a plurality of video cameras 112 for recording the soccer game. The video cameras 112 may include a mechanism, such as a pneumatic mechanism, a hydraulic mechanism, or a combination of both, to adjust characteristics associated with the video cameras 112. In addition, a camera operator in the feed distribution system 116, not shown in FIG. 1, may move the camera 112 side to side across a track 114 for different viewing perspectives. For example, the characteristics may include the locational coordinates of camera 112 on the track 114, the height of the camera 112, how far the video camera 112 lens is zoomed in or out, the pitch angle of the camera, the roll angle of the camera, and the yaw angle of the camera. These characteristics will be further utilized below.

Figure 2:
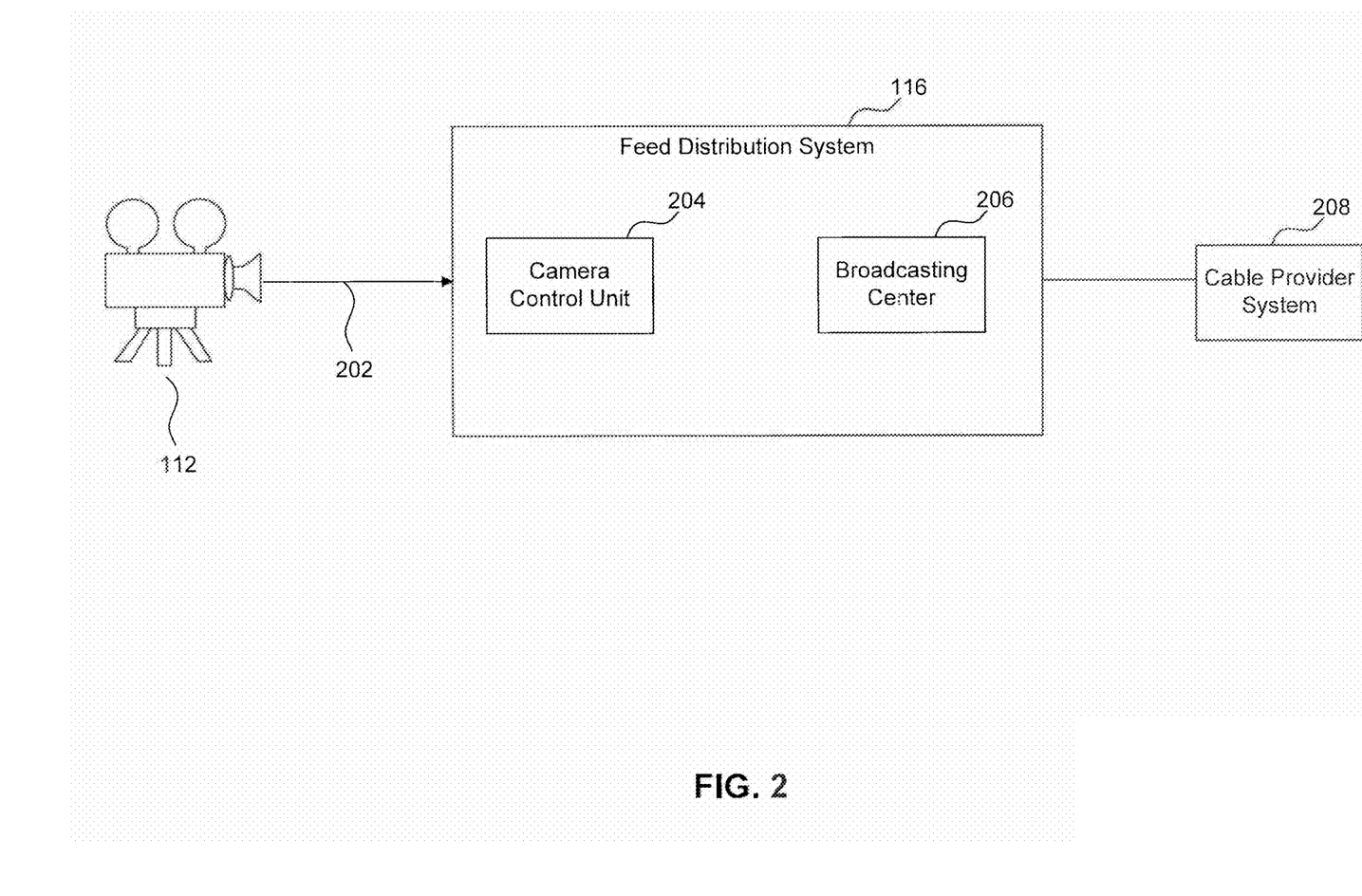
FIG. 2 is a block diagram of a feed distribution system, according to some embodiments.

FIG. 2 is a block diagram of a feed distribution, system 116, according to an embodiment. In an embodiment, the output video stream of camera 112 connects to the feed distribution system 116 via connection 202. For example, the connection 202 may be a fiber optic connection, a coaxial cable, a triaxial cable, or a multicore cable. In an alternative embodiment, the output video stream of camera 112 may connect to local storage device, such as a hard disk, a solid state memory device, a USB memory stick, or an SD card, for subsequent processing analysis. Feed distribution system 116 may include a camera control unit 204 and a broadcasting center 206. The camera control unit 204 may be one or more servers configured to power the camera 112, control the characteristics associated with the camera 112, and receive a video feed from the camera 112. In addition, as mentioned above, an operator may sit in the camera control unit 204 to control the video camera 112 along the track 114. The broadcasting center 206 may be one or more servers and a transceiver configured to receive the video feed of camera 112 from camera control unit 204 and transmit the video feed to a cable provider system 208. Examples of the cable provider system 208 may be COMCAST or VERIZON FIOS. In an embodiment, the broadcasting center 206 transmits the video feed over-the-air to the cable provider system 208. In an alternative embodiment, the broadcasting center 206 may transmit the video feed to the cable provider system 208 over coaxial cable or a fiber optic connection.

Figure 3:
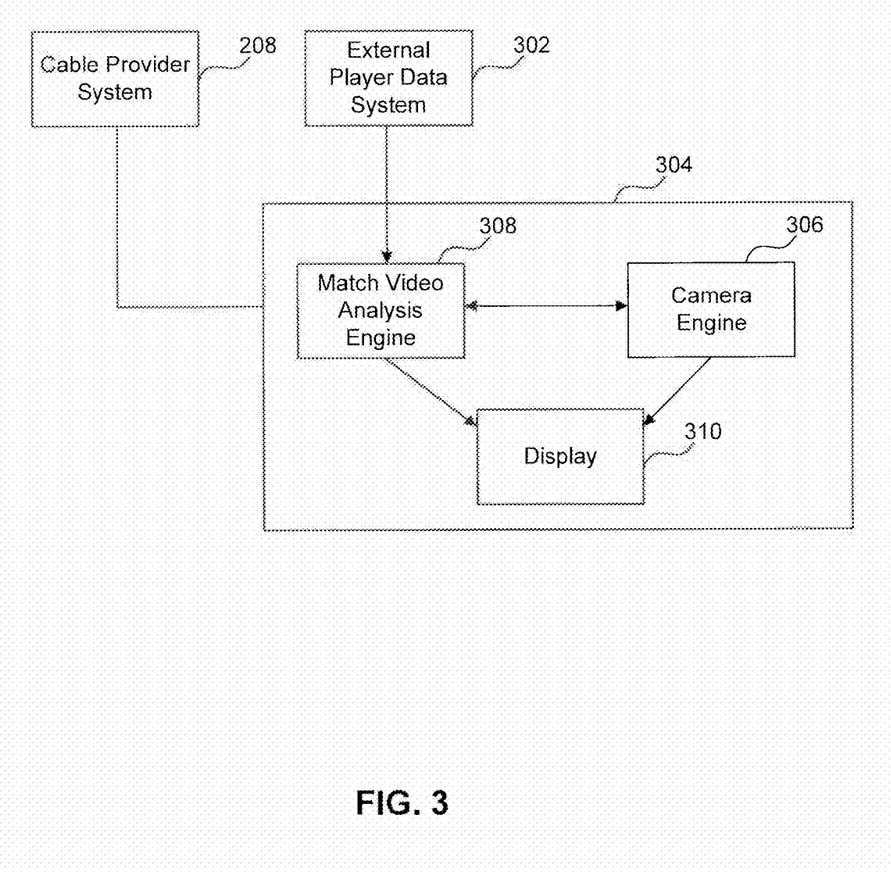
FIG. 3 is a block diagram of an external player data system and a cable provider interacting with a video embedded system, according to some embodiments.

FIG. 3 is a block diagram of an external player data system 302 and a cable provider system 208 interacting with a video embedded system 304, according to an embodiment. The cable provider system 208 distributes the video feed from camera 112 to the video embedded system 304. The external player data system 302 may be an external data provider, which provides a continuous stream of positional information associated with each of the players 106 in the current soccer garde. In an embodiment, the external player data system 302 may include a GPS tracker device for each of the players 106 in a soccer game on the soccer pitch 104 shown in the video feed from camera 112. For example, each of the GPS tracker devices provides positional information, such as latitude and longitudinal coordinates, for each of the players 106 for every frame of the video feed from camera 112. In an alternative embodiment, other tracking solutions, such as location-based services, may be used in combination with GPS tracking to further improve the quality and accuracy of the positional information. In addition, the external player data system 302 reports additional information associated with the positional information for each of the players 106. Specifically, the external player data system 302 reports which team is associated with bench 110A and which team is associated with 110B. The additional information reports which team kicks the soccer ball 108 off first and which goal each team will attack during the first half of the game. For example, a team associated with bench 110A may attack a goal on the same side as bench 110A during the first half of the game. At the start of the second half, the camera engine 306 knows the team associated with bench 110A attacks the opposing goal. Based on the additional information, the match video analysis engine 308 and the camera engine 306 may accurately map the received positional information to the players 106 on a particular team during the first half. Additionally, at the start of the second half, the camera engine 306 knows that both teams switch sides of the soccer pitch 104 and attacks an opposite goal. In this manner, the camera engine 306 associates the positional information with the players 106 based on the new direction of attack.

In an embodiment, the video embedded system 304 may include a camera engine 306, a match video analysis engine 308, and a display 310. Examples of the video embedded system 304 may include mobile devices, standalone workstations, personal computers (PCs), phones, tablets, smart watches, etc. The camera engine 306 may be configured to determine parameters associated with camera 112. The parameters define the characteristics of the camera 112, as mentioned above. The match video analysis engine 308 may be configured to receive video feed from a cable provider system 208, receive player positional information from external player data system 302, and receive camera parameters from the camera engine 306. In addition, the match video analysis engine 308 maps the positional information to the display 310 based on the video feed and the determined camera parameters, as explained below in FIGS. 4-7 below.

Figure 4:
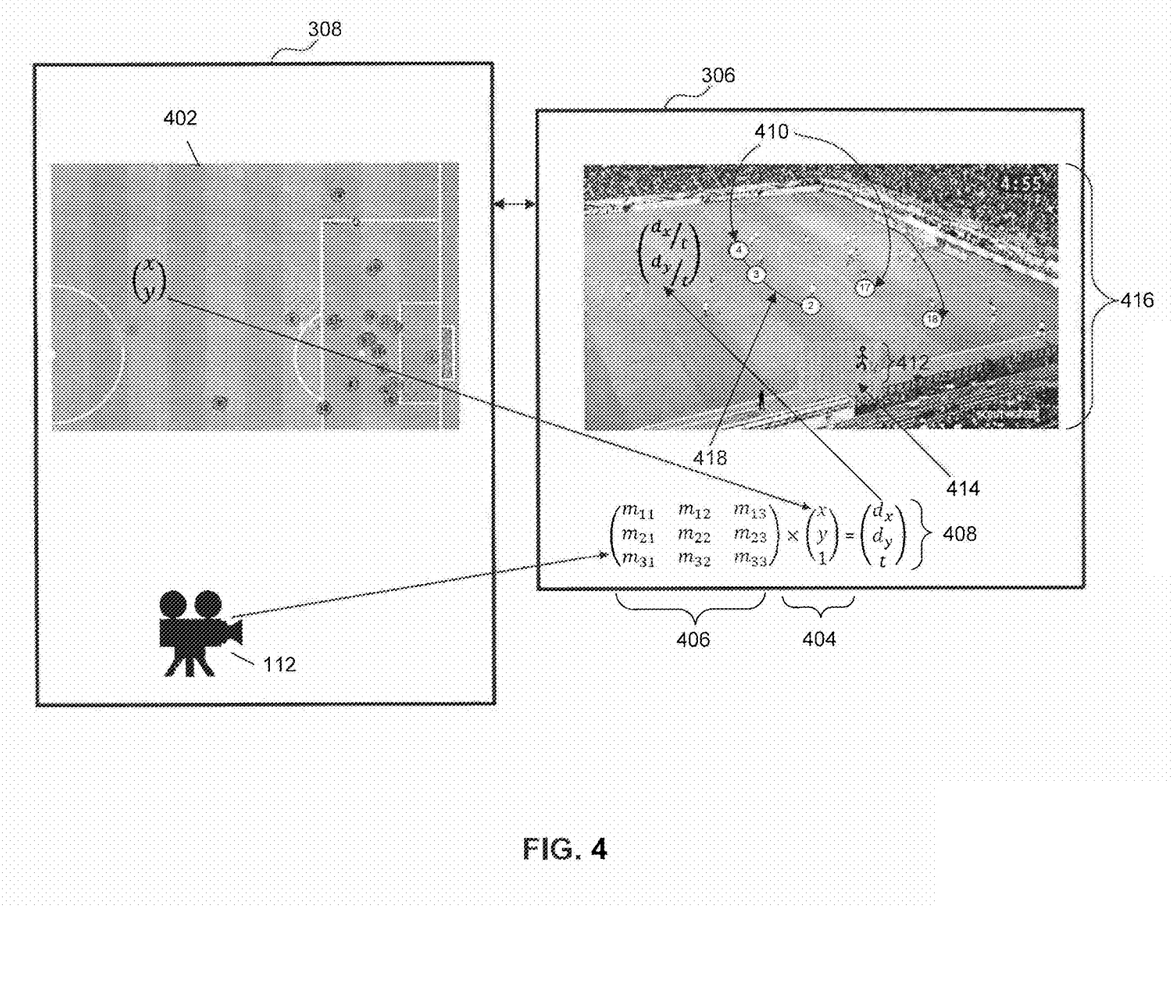
FIG. 4 is a block diagram illustrating functionality of match video analysis engine and camera engine, according to an embodiment.

FIG. 4 is a block diagram illustrating functionality of a match video analysis engine 308 and camera engine 306, according to an embodiment. The match video analysis engine 308 and the camera engine 306 tracks players 106 based on the received positional information. These two engines convert the positional information into markings associated with one or more selected players 106 on the display 310 as shown by the camera 112. Because the camera 112 may show a different view than that of the 2-D virtual field 412, such as a zoomed in view, a one to one mapping of the positional information to the display 310 as shown by camera 112 would result in incorrect markings. Therefore, the match video analysis engine 308 and the camera engine 306 may transform the positional information to match a view of the camera 112. This will be further described below.

Figure 5:
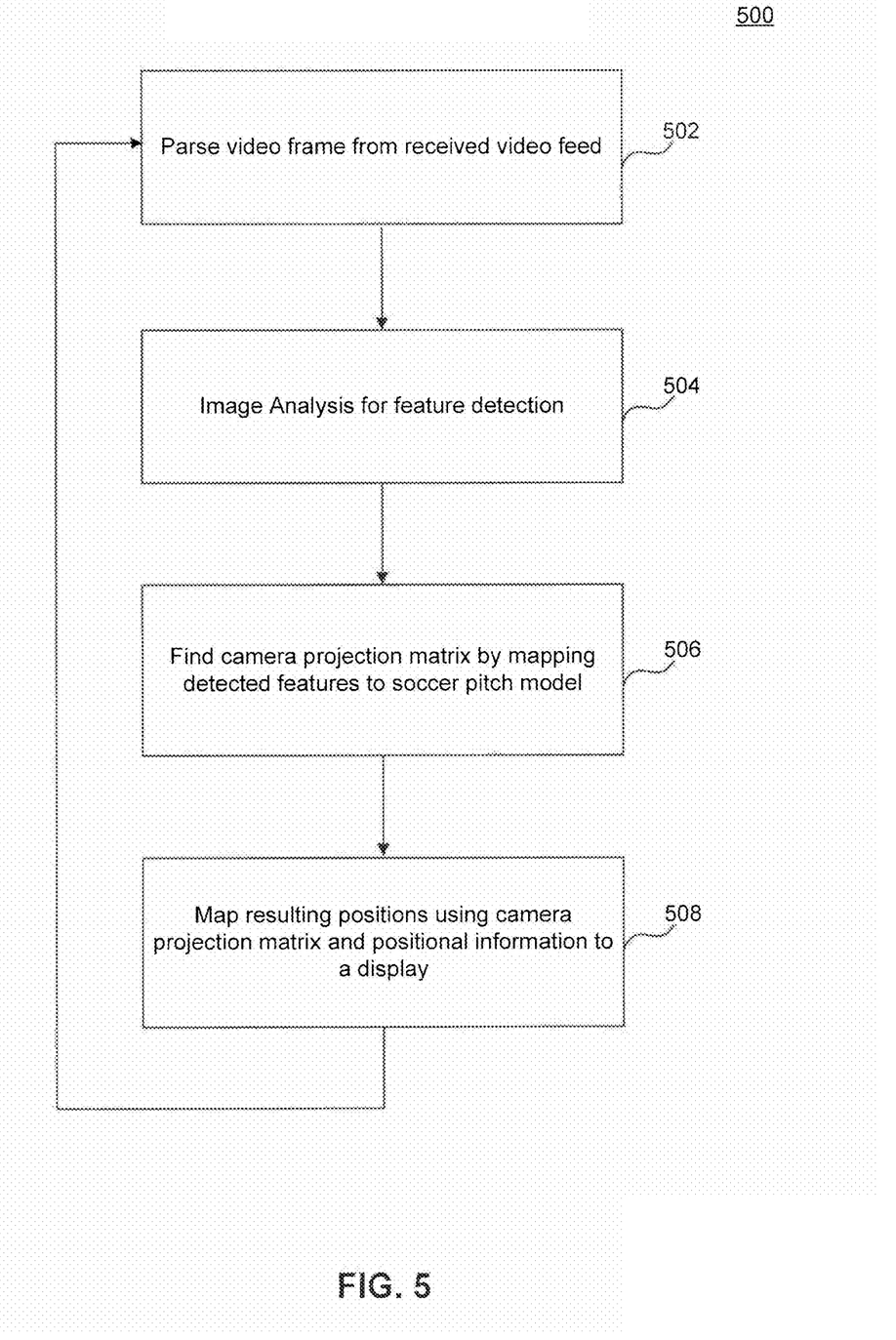
FIG. 5 is a flowchart illustrating operations of the match video analysis and the camera engine, according to some embodiments.
Figure 6:
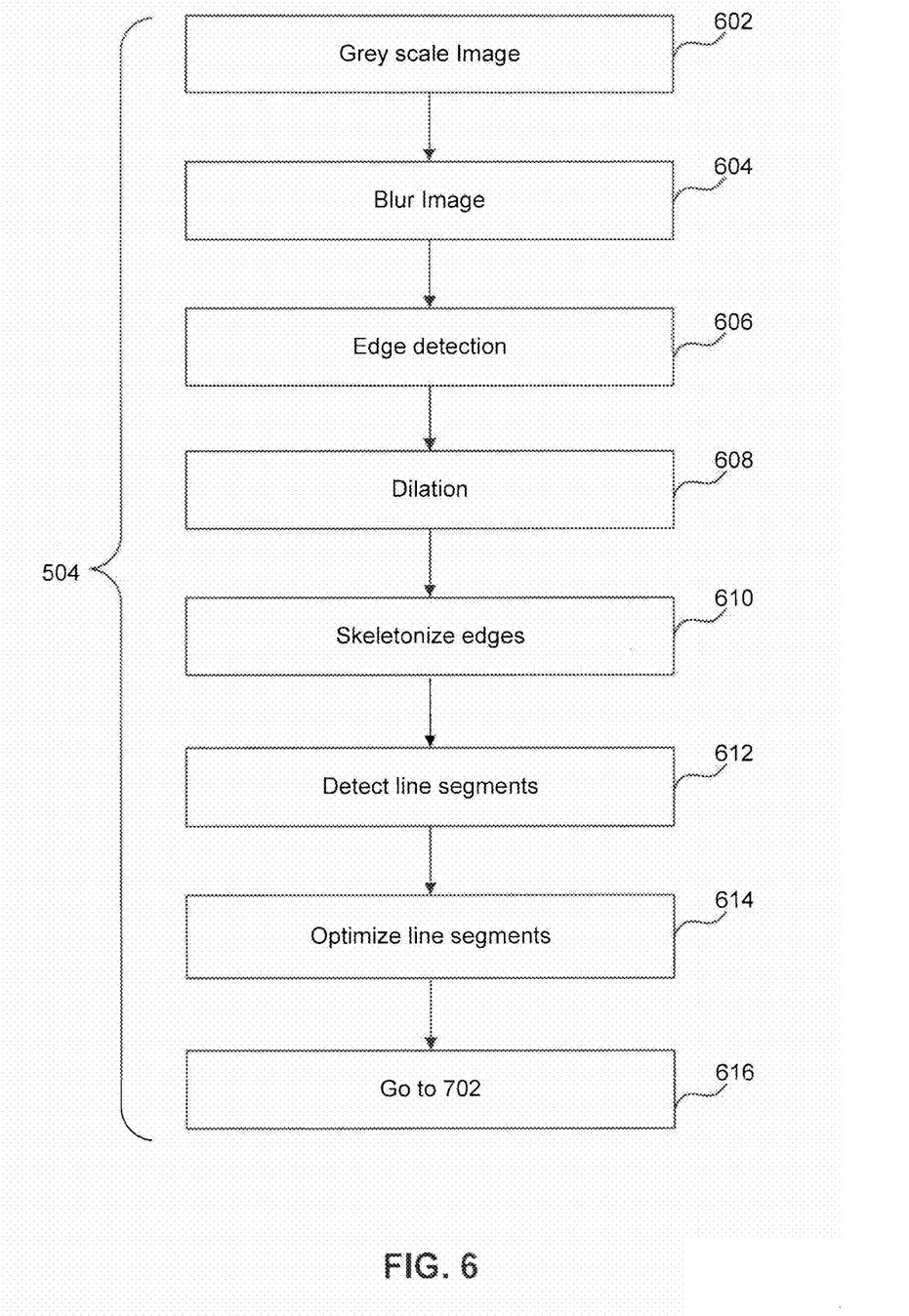
FIG. 6 is a flowchart illustrating image analysis for feature detection of the positional transformation module, according to some embodiments.
Figure 7:
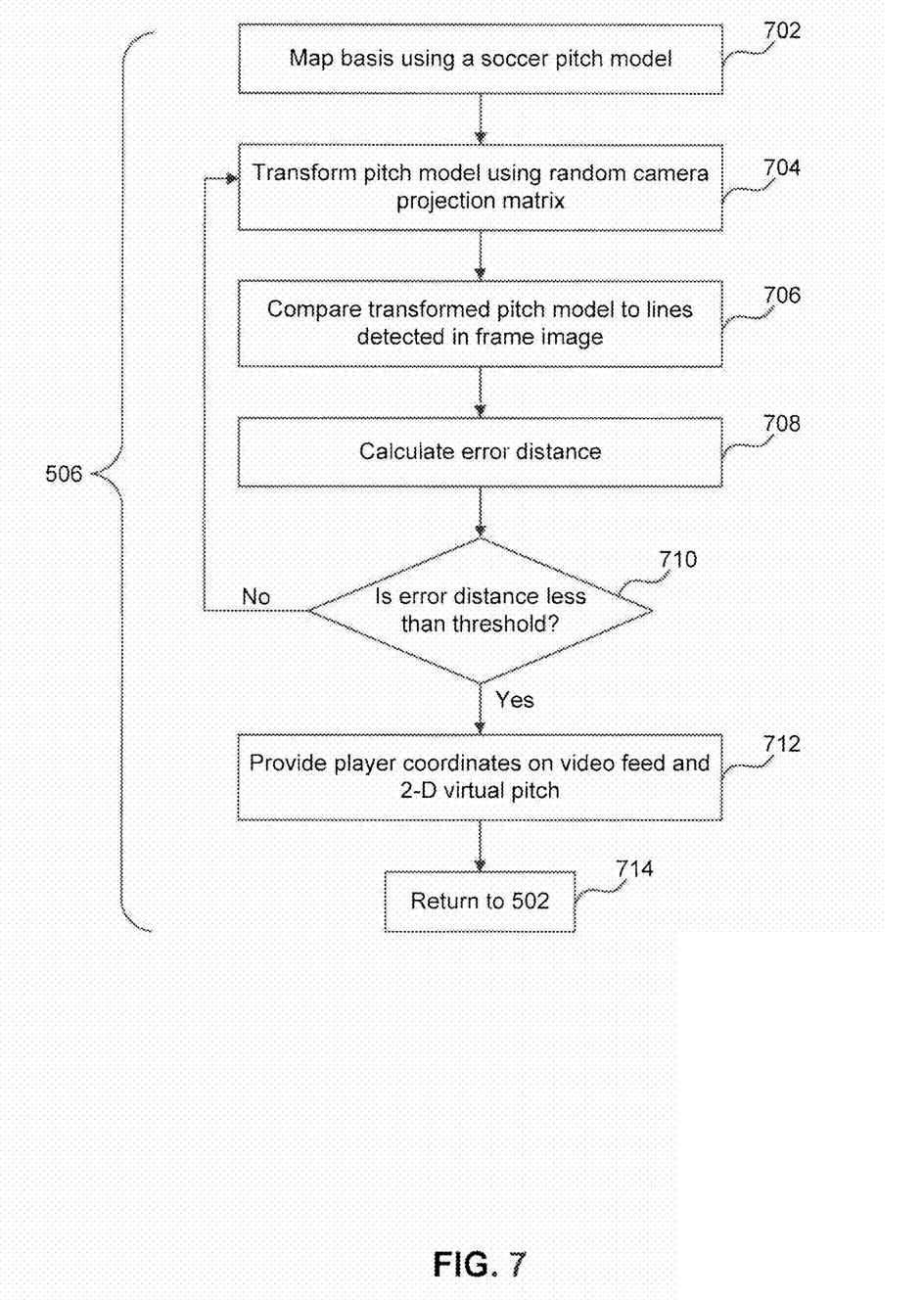
FIG. 7 is a flowchart illustrating camera parameter determination for the positional transformation module, according to some embodiments.

As shown in the match video analysis engine 308, the match video analysis engine 308 receives video feed from camera 112 through a cable provider system 208 and positional information associated with each of the players 106. For example, the positional information is shown with X and Y coordinates illustrated on the soccer pitch 104 in a soccer diagram 402. The match video analysis engine 308 transmits the video feed and positional information to the camera engine 306 for further processing. Specifically, the camera engine 306 determines a position for each of the players 106 in every frame of the video feed. In order for the camera engine 306 to determine a resulting player position 408, the camera engine 306 must determine values for a camera projection matrix 406. The values of camera projection matrix 406 may describe each of the aforementioned characteristics of camera 112. FIGS. 5-7 below explain how the camera engine 306 determines the values of camera projection matrix 406. For example, the values of the camera projection matrix 406 may be denoted as $[m_{11}, m_{12}, m_{13}; m_{21}, m_{22}, m_{23}; m_{31}, m_{32}, m_{33}]$, where the subscript numbers represent locations in the camera projection matrix 406. For example, values for the camera projection matrix 406 may be [2.083425309207339, −0.9786849929943365, −33.00891183099527; 0.02593674672492149, 0.4275201353451168, 76.35175439997649; −0.00034818430366787767, −0.00072445694924837745, 1]. After the camera engine 306 determines the values of camera projection matrix 406, the camera engine 306 multiplies the camera projection matrix 406 by the positional information 404 for each of the players 106 to determine the resulting player position 408 in a video frame. In an embodiment, FIG. 4 illustrates the positional information 404 having a value of 1 in the Z direction to denote a flat plane, such as the soccer pitch 104. In an alternative embodiment, a different value may be used to denote varying levels of height on the soccer pitch 104. The match video analysis engine 308 plots the resulting player position 408 on the display 310.

In an embodiment, the match video analysis engine 308 marks one or more selected players 106 with a dot 410, based on the resulting player position 408, to denote tracking on the display 310 for each video frame. Specifically, a user may select the players 106 or a predefined group of players, such as offense or defense, to be marked. For example, a user may select three offensive players individually or as a predefined group. Further, the match video analysis engine 308 may connect the one or more selected players, or their corresponding dots 410, with a line in order to emphasize their group configuration, such as line 418. The dot may be one color, such as red, for one team and another color, such as blue, for an opposing team. In an embodiment, the colors for each team may be configured in a configuration file, not shown, in FIG. 4. In addition, the match video analysis engine 306 maps the positional information 404 on the 2-D virtual field 412. The 2-D virtual field 412 displays dots associated with each of the players 106 based on their positional information 404. In an embodiment, the match video analysis engine 308 draws a cover shadow for each of the one or more selected players 106. The cover shadow shows a predicted direction of movement for each of the one or more selected players 106 in each video frame. Specifically, the cover shadow may be any shape protruding from the feet of each of the one or more selected players 106 parallel to the soccer pitch 104 in the direction of predicted movement in the video frame. The cover shadow may be displayed to the display 310.

FIG. 5 is a flowchart for a method 500 for operation of the match video analysis 308 and the camera engine 306, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure herein. Further, some of the steps may be performed simultaneously, or in a different order than shown in FIG. 5, as will be understood by a person of ordinary skill in the art.

Method 500 shall be described with reference to FIG. 5. However, method 500 is not limited to that example embodiment.

In 502, the match video analysis engine 308 parses a video frame from a received video feed, according to an embodiment. The match video analysis engine 308 receives a video feed from cable provider system 208. The match video analysis engine 308 slices or captures a video frame from the video feed. In an embodiment, the video frame may be a still image of the video feed. In an alternative embodiment, the video frame may be a predetermined length snapshot, such as 1 second, of the video feed. The length of the snapshot may be configured in the configuration file.

In 504, the camera engine 306 performs image analysis for feature detection on the received video frame, according to an embodiment. Specifically, the camera engine 306 receives the video frame from the match video analysis engine 308. The camera engine 306 performs image analysis for each video frame of the video feed. The image analysis will be further described below in FIG. 6.

In 506, the camera engine 306 determines a camera projection matrix 406 by mapping detected features based on the image analysis from 502 to a soccer pitch model, according to an embodiment. Specifically, the camera engine 406 determines values for the camera projection matrix 406 for every video frame received from the video camera 112. In an embodiment, the camera engine 406 multiplies the camera projection matrix 406 by positional information 404 for each of the players 106 to determine the resulting player position 408. The camera engine 306 compares the results to the soccer pitch model to minimize the error. This will Le further explained below.

In 508, the match video analysis engine 308 marks the resulting player positions 408 in the video frame based on a user selection, according to an embodiment. Specifically, the match video analysis engine 308 receives the resulting player position 408 from the camera engine 306 and marks the resulting player position 408 with a dot 410 based on selection, from, a user. In addition, the match video analysis engine 308 maps the resulting player positions 408 following the marking to the display 310. Further, the match video analysis engine 306 maps the positional information 404 on the 2-D virtual field 412. The 2-D virtual field 412 displays dots 414 associated, with each of the players 106 based on their positional information 404.

In an embodiment, the match video analysis engine 308 returns to 502 to retrieve the next video frame after marking the dots 410 in the video frame,the dots 414 to the 2-D virtual field, and mapping the dots 410 and dots 414 to the display 310. The match video analysis engine 308 updates the dots 410 and the dots 414 for every video frame. Method 500 continues until the video feed ends.

FIG. 6 is a flowchart for a method 600 for operation of the feature detection of the match video analysis 308 and the camera engine 306, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure herein. Further, some of the steps may be performed simultaneously, or in a different order than shown in FIG. 6, as will be understood by a person of ordinary skill in the art.

Method 600 shall be described with reference to FIG. 6. However, method 600 is not, limited to that example embodiment. In addition, method 600 further describes the image analysis for feature detection in 504.

In 602, the camera engine 306 receives the video frame from the match video analysis engine 308 and initiates the process of image analysis, according to an, embodiment. Specifically, the camera engine 306 initiates image analysis by grey scaling the video frame. The video frame includes pixels and each pixel includes red, green, and blue values. The camera engine 306 may use one or more algorithms to convert the red, green, and blue values into a grey value. For example, the conversion algorithms may include averaging, desaturation, decomposition, and dithering, to name a few examples. The camera engine 306 replaces each of the red, green, and blue values with the single grey value for each of the pixels in the video frame.

In 604, the camera engine 306 blurs the grey-scaled image, according to an embodiment. Specifically, the camera engine 306 blurs the grey-scaled image by spreading and mixing each grey pixel of the video frame into surrounding pixels. The camera engine 306 may use one or more algorithms to blur each of the pixels. For example, the blurring algorithms may include a Gaussian blur, a box blur, and a motion blur, to name a few examples. The camera engine 306 blurs the grey-scaled image in order to reduce its overall noise level.

In 606, the camera engine 306 performs edge detection of the blurred image, according to an embodiment. Specifically, the camera engine 306 performs edge detection to detect features in the blurred image where image brightness sharply changes or has discontinuities. For example, the edge detection is useful in finding the goal lines or centerline of a soccer pitch 104. The camera engine 306 applies one or more edge detection algorithms to return image points or image pixels, which exist on the desired edge, such as the centerline, of the blurred image. For example, the edge detection algorithms may include canny edge detection, first order edge detection, and second order edge detection, to name a few examples. In an embodiment, the edge-detection, algorithms may produce proximate image pixels on an edge. In an alternative embodiment, the resulting edge-detection may produce proximate image pixels on an edge with gaps between subsequent pixels. The camera engine 306 uses different algorithms explained below to fill in the subsequent gaps.

In 608, the camera engine 306 performs dilation on the edge-detected image, according to an embodiment. Specifically, the camera engine 306 dilates the edge detected image to produce an edge detected image of a different size. Specifically, dilation may expand or shrink an image around a fixed point. In an embodiment, the camera engine 306 may use the edge detected features as the fixed point. Dilation is a process by which the edge detected image is convoluted with a structural image of any shape, such as a square of circle. As the convolution occurs, the camera engine 306 calculates a maximum pixel value at the overlapping point in the convolution and the maximum pixel value replaces the image pixel at the fixed point. This operation causes the edge detected image to expand. As a result of dilation, angle measurements, parallelism, orientation, and colinearity all remain the same as the edge detected image expands.

In 610, the camera engine 306 skeletonizes the dilated image, according to an embodiment. Specifically, the camera engine 306 skeletonizes or thins the dilated image using one or more algorithms to remove all unwanted points on the edges. Skeletonizing the video image processes the dilated image to have one-pixel thick edge elements while preserving the overall structure of the detected edges. For example, the algorithms may include mark-and-delete thinning, stentiford thinning, and zhang-suen thinning, to name a few examples.

In 612, the camera engine 306 detects line segments from the skeletonized image, according to an embodiment. Specifically, the camera engine 306 may group the image points or image pixels from the skeletonized image to create line segments using one or more algorithms. In order to detect line segments from the image, pixels or points, the camera engine 306 applies one or more shape-based algorithms to detect and isolate various groupings of the image pixels on the detected edges. For example, the shape-based algorithms may include hough transforms, blob extraction, and template, matching, to name a few examples.

In an embodiment, the shape-based algorithms return a list of lines from the image pixels on the detected edges with multiple starting and ending points. For example, if the camera engine 306 uses the hough transform, the hough transform may use a polar coordinate system to track an intersection between generated curves for every image pixel in the video frame. If the number of intersections between the curves for each image pixel is above a pre-configured threshold, then the hough transform declares a line and returns a line for that image pixel. The hough transform returns a list of lines with a starting X and Y point and an ending X and Y point. The X and Y points denote locational values on the video frame.

In 614, the camera engine 306 optimizes the line segments from the results of the shape-based algorithms, according to an embodiment. Sometimes gaps may exist in the linesegmented image, such as missing image points or image pixels between subsequent image points or image pixels. These gaps in the line-segmented image may be caused by different reasons, such as—a player 106 standing on a portion of the goal line in the soccer pitch 104; a fan reaching over the stands with a flag to block an end line; and, the soccer ball 108 hovering over the centerline, to name a few examples.

In an embodiment, the camera engine 306 optimizes the line segments with gaps by connecting the gapped line segments. Specifically, the camera engine 306 is configured to recognize parallel lines, lines of similar angles, and configured distances between lines based on known dimensions of soccer pitch 104. For example, it is well known by a person of ordinary skill in the art that for international matches the width of the goal line must be between 64 and 75 meters (70 and 80 yards) and touchlines must be between 100 and 110 meters (110 and 120 yards) in length. Additionally, it is well known that a center mark lies at the midpoint of the halfway line and consists of a circle with a radius of 9.15 meters (10 yards). These well-known standards were set into law by the International Football Association Board (IFAB). Based on these known distances, camera engine 306 searches for these dimensions in the line results of the shape-based algorithm, and connects one or more line results when gaps exists between subsequent lines based on known line configurations on the soccer pitch 104.

In addition to the algorithms defined in method 600, other algorithms may be applied to further enhance the camera engine 306's results. For example, applying machine learning techniques such as feature learning and neural networks, may be used in combination with method 600 to improve feature detection for any subsequent video frame. In 616, the method proceeds to 702 to continue processing the video frame, according to an embodiment.

FIG. 7 is a flowchart for a method 700 for operation of finding the camera projection matrix 406 by mapping detected features to a soccer pitch model, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure herein. Further, some of the steps may be performed simultaneously, or in a different order than shown in FIG. 7, as will be understood by a person of ordinary skill in the art.

Method 700 shall be described with reference to FIG. 7. However, method 700 is not limited to that example embodiment. In addition, method 700 further describes finding the camera projection matrix 406 by mapping the detected features to the soccer pitch 104 in 506.

In 702, the camera engine 306 retrieves a soccer pitch model, according to an embodiment. The camera engine 306 retrieves the soccer pitch model stored in its memory, not shown, in FIGS. 3 and 4. In an embodiment, the soccer pitch model is a 3-D representation of a soccer field. In an embodiment, the soccer field may be a standard soccer field model or an international soccer field model. As mentioned above, the standard soccer field model and the international soccer field model have different dimensions for the length of the lines on the soccer pitch. For example, the lines may be the goal lines, the touchlines, and the centerline, to name a few examples, In an embodiment, the camera engine 306 incorporates a simulated camera based on the camera projection matrix 406 into the soccer pitch model. The simulated camera returns a view of the soccer pitch model to the camera engine 306. Specifically, the simulated camera returns a view of a portion of the soccer pitch model as if camera 112 were viewing a portion of the soccer pitch 104. The simulated camera views a portion of the soccer pitch model based on values defined in the camera projection matrix 406. As mentioned above, the camera projection matrix 406 is defined as $[m_{11}; m_{12}, m_{13}; m_{21}, m_{22}, m_{23}; m_{31}, m_{32}, m_{33}]$. For example, the values of the camera projection matrix 406 cumulatively define the simulated camera's locational coordinates on a simulated track, the height of the simulated camera, how far the simulated camera lens is zoomed in or out, the current pitch angle of the simulated camera, the current roll angle of the simulated camera, and the current yaw angle of the simulated camera. The simulated camera will view a portion of the soccer pitch model based on the values of the camera projection matrix 406. For example, if the values of the camera projection matrix 406 were defined as [1, 2, 5; 6, 7, 9; 10, 11, 13], the simulated camera may view a soccer pitch model similar to the soccer portion view 416.

In 704, the camera engine 306 transforms the soccer pitch model, using random values for the camera projection matrix 406, according to an embodiment. Specifically, the camera engine 306 chooses each of the values for the camera projection matrix 406 based on a random selection. For example, the camera engine 306 may choose values for the camera projection matrix 406 based on a random function based on a random seed id number. In an alternative embodiment, other methods, such as optimizations algorithms, could be used to further improve the efficiency of selecting values for the camera projection matrix 406, such as gradient descent algorithms, genetic algorithms, and simulated annealing, to name a few examples. In an embodiment, the camera engine 306 chooses values based on random selection for a first video frame from the video feed. In an alternative embodiment, the camera engine 306 chooses each of the values for the camera projection matrix 406 based on values for the camera projection matrix 406 from a previous subsequent video frame. Specifically, the camera engine 306 chooses a range of values to randomize for the current video frame based on the values of the previous video frame. For example, the values of the previous video frame may be defined as [1, 2, 5; 6, 7, 9; 10, 11, 13]. The camera engine 306 may define a range of values with a deviation of a predetermined amount, such as two, for each value in the camera projection matrix 406. Therefore, the values for the camera projection matrix 406 of the current video frame may be in the following ranges: [0-2, 1-3, 4-6; 5-7, 6-8, 8-10; 9-11, 10-12, 12-14]. In an embodiment, the camera engine 306 will randomize these ranges of numbers for the current video frame. The camera engine 306 may use the range of numbers for the camera projection matrix 406 because camera movement is minimal from one video frame to the next video frame. In order to improve the camera engine 306's efficiency, the camera engine 306 may randomize numbers between the number ranges to minimize camera adjustments. Continuing with the above example, the camera engine 306 may adjust the new values for the camera projection matrix 406 to be [1.1, 2.1, 5.8; 5.1, 7.3, 9.4; 9.6, 10.4, 13.9]. The adjustments to the camera projection matrix 406 will also adjust the views associated with the simulated camera.

In 706, the camera engine 306 compares the transformed soccer pitch model to the lines determined from the shape-based algorithms, according to an embodiment. Specifically, the camera engine 306 overlays the lines on top of the view associated with the simulated camera of the soccer pitch model. A goal of the camera engine 306 is to align the lines from the shape-based algorithm with the lines in the view from the soccer pitch model. This reduces the overall error in determining the camera projection matrix 406.

In 708, the camera engine 306 calculates the error distance between each of the lines from the shape-based algorithms to the lines in the transformed soccer pitch model, according to an embodiment. The camera engine 306 computes the error distance between each of the lines and a closest nearby line in the soccer pitch model. In an embodiment, the camera engine 306 computes the error distance in pixels or image points. Specifically, the camera engine 306 may calculate the error distance based on angle differences, length of line differences, thickness of each line, known distance on the standard soccer field.

In 710, the camera engine 306 compares each of the error distances to a threshold, according to an embodiment. Specifically, the threshold may be pre-configured and adjusted based on user input. For example, the pre-configured threshold may be five pixels. If the camera engine 306 determines each of the error distances associated with each of the lines are within the threshold, then the process moves to 712. If at least one of the error distances is greater than the pre-configured threshold, the process returns to 704, and the camera engine 306 adjusts values of the camera projection matrix 406 associated with the error distances greater than the threshold. For example, camera engine 306 determines the error distance associated with zoom is greater than the threshold. In addition, the top row of camera projection matrix 406 is associated with the zoom in/out feature, in particular, the $[m_{11}, m_{12}, m_{13}]$ values. The camera engine 306 adjusts the values of the top row of camera projection matrix 406 in 704, and proceeds to 706 through 710 to see if the adjustments improved the overlay of the lines on top of the soccer pitch model. In an embodiment, this process may take n iterations until the threshold at least meets or exceeds the error distance values, where n is a number ranging from 1 to a pre-configured maximum number. For example, the pre-configured maximum number may be 100.

In 712, the camera engine 306 provides the coordinates for each of the players 106 to the match video analysis engine 308, according to an embodiment. Specifically, the camera engine 306 multiplies the camera projection matrix 406 by each of the positional information 404 for each of the players 106. The camera engine 306 transmits the resulting player position 408 to the match video analysis engine 308 for plotting on display 310. Specifically, the match video analysis engine 308 plots the resulting player position 408 on the soccer portion view 416. In addition, the match video analysis engine 308 plots a dot 410 on the soccer portion view 416 based on the resulting player position 408 to denote tracking each of the players 106. Further, the match video analysis engine 308 plots dots 414 to the 2-D virtual field 412 associated with each of the players 106 based on, their positional information 404.

Figure 8:
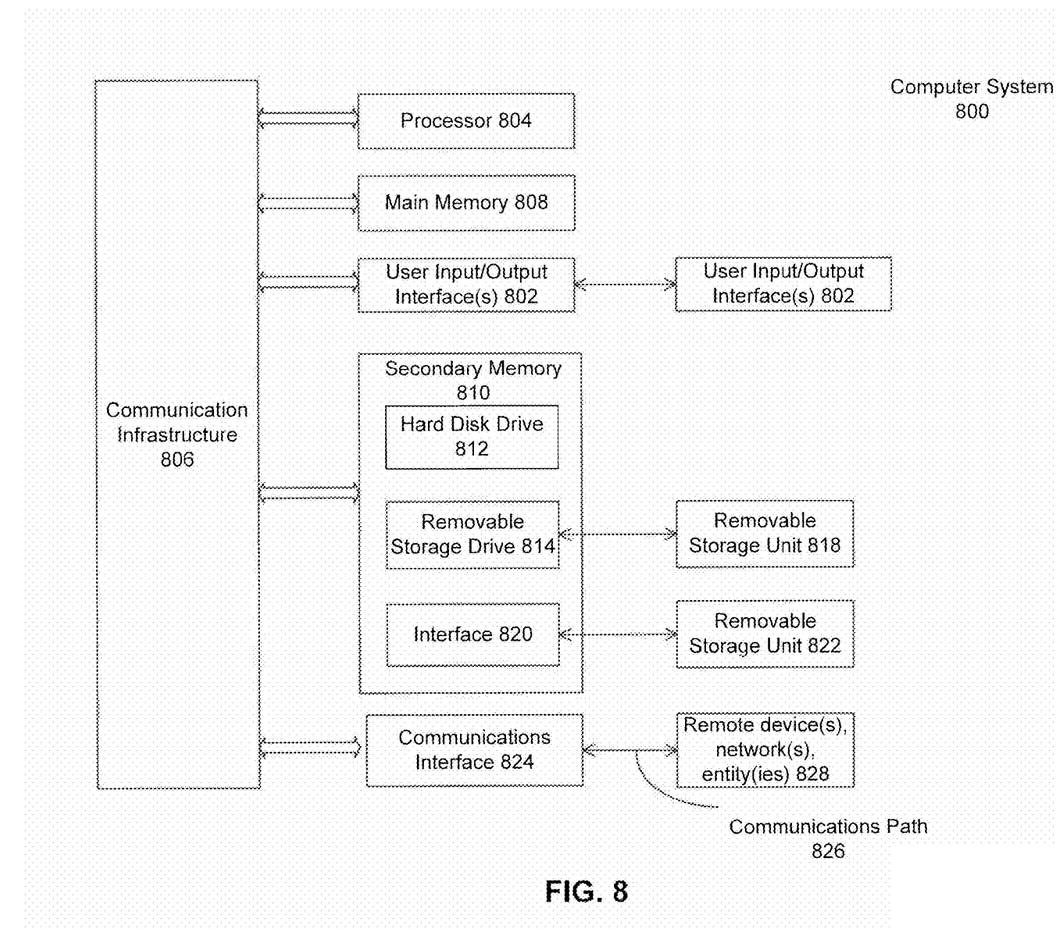
FIG. 8 is an example computer system useful for implementing various embodiments or portions thereof.

Various embodiments can be implemented, for example, using one or more computer systems, such as computer system 800 shown in FIG. 8. Computer system 800 can be used, for example, to implement method 500 of FIG. 5, method 600 of FIG. 6, and method 700 of FIG. 7. For example, computer system 800 can perform operations for the match video analysis engine 308 and the camera engine 306, according to some embodiments. Computer system 800 can further perform operations of feature detection for image analysis for the match video analysis engine 308 and the camera engine 306, according to some embodiments. Computer system 800 can further find the camera projection matrix 406 by mapping detected features to a soccer pitch model, according to some embodiments. Computer system 800 can be any computer capable of performing the functions described herein.

Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more, levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 reads from and/or writes to removable storage, unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for embedding information in a video feed, comprising:

analyzing, by at least one processor, a video frame from the video feed to detect features of a playing field in the video frame and generate a camera projection matrix based on a model of the playing field and the detected features;

grey scaling, by the at least one processor, the video frame;

blurring, by the at least one processor, the grey-scaled frame;

detecting, by the at least one processor, one or more edges in the blurred frame;

dilating, by the at least one processor, the edge-detected frame;

skeletonizing, by the at least one processor, the dilated frame;

detecting, by the at least one processor, line segments from the edges in the skeletonized frame;

optimizing, by the at least one processor, the line segments by connecting one or more of the line segments when gaps exist between subsequent line segments for known line dimensions on a standard pitch;

converting, by the at least one processor, positional information associated with a player shown in the video feed using the camera projection matrix; and marking, by the at least one processor, the converted positional information associated with the player in the video frame.

2. The method of claim 1, further comprising:
receiving, by the at least one processor, additional information associated with a direction a team may attack a goal on the playing field.

3. The method of claim 1, wherein the positional information comprises latitude and longitudinal information associated with each of the players.

4. The method of claim 1, wherein the comparing further comprises:
determining, by the at least one processor, resulting player positions by multiplying the camera projection matrix by the positional information associated with each of the players when the error distance is less than the threshold; and
mapping, by the at least one processor, the resulting player positions with dots associated with each of the players in the video feed to a display.

5. The method of claim 1, wherein the comparing further comprises:
adjusting, by the at least one processor, one or more elements in the camera projection matrix when the error distance is greater than the threshold.

6. A system, comprising:
a memory; and
at least one processor coupled to the memory and configured to:
analyze a video frame from a video feed to detect features of a playing field in the video frame and generate a camera projection matrix based on a model of the playing field and the detected features;
grey scale the video frame;
blur the grey-scaled frame;
detect one or more edges in the blurred frame;
dilate the edge-detected frame;
skeletonize the dilated frame;
detect line segments from the edges in the skeletonized frame;
optimize the line segments by connecting one or more of the line segments when gaps exist between subsequent line segments for known line dimensions on a standard pitch;
convert positional information associated with players shown in the video feed using the camera projection matrix; and
mark the positional information associated with the players in the video frame.

7. The system of claim 6, the at least one processor further configured to:
receive additional information associated with a direction a team may attack a goal on the playing field.

8. The system of claim 6, wherein the positional information comprises latitude and longitudinal information associated with each of the players.

9. The system of claim 6, the at least one processor further configured to:
determine resulting player positions by multiplying the camera projection matrix by the positional information associated with each of the players when the error distance is less than the threshold; and
map the resulting player positions with dots associated with each of the players in the video feed to a display.

10. The system of claim 6, the at least one processor further configured to:
adjust one or more elements in the camera projection matrix when the error distance is greater than the threshold.

11. A tangible computer-readable device having instructions stored thereon that, when executed by at least one computing device, causes the at least one computing device to perform operations comprising:
analyzing a video frame from a video feed to detect features of a playing field in the video frame and generate a camera projection matrix based on a model of the playing field and the detected features;
grey scaling the video frame;
blurring the grey-scaled frame;
detecting edges in the blurred frame;
dilating the edge-detected frame;
skeletonizing the dilated frame;
detecting line segments from the edges in the skeletonized frame;
optimizing the line segments by connecting one or more of the line segments when gaps exist between subsequent line segments for known line dimensions on a standard pitch;
converting positional information associated with players shown in the video feed using the camera projection matrix; and
marking the positional information associated with the players in the video frame.

12. The computer-readable device of claim 11, further comprising:
receiving additional information associated with a direction a team may attack a goal on the playing field.

13. The computer-readable device of claim 11, wherein the positional information comprises latitude and longitudinal information associated with each of the players.

14. The computer-readable device of claim 11, wherein the comparing further comprises:
determining resulting player positions by multiplying the camera projection matrix by the positional information associated with each of the players when the error distance is less than the threshold; and
mapping the resulting player positions with dots associated with each of the players in the video feed to a display.

15. A computer implemented method for embedding information in a video feed, comprising:
analyzing, by at least one processor, a video frame from the video feed to detect features of a playing field in the video frame and generate a camera projection matrix based on a model of the playing field and the detected features;
retrieving, by the at least one processor, a pitch model;
incorporating, by the at least one processor, a simulated camera based on the camera projection matrix into the pitch model
selecting, by the at least one processor, values for the camera projection matrix based on at least one of random selection and a range from previous values;
calculating, by the at least one processor, an error distance between lines in a view of the simulated camera of the pitch model to line segments detected in the video frame by image analysis;
comparing, by the at least one processor, the error distance to a threshold;
converting, by the at least one processor, positional information associated with a player shown in the video feed using the camera projection matrix; and
marking, by the at least one processor, the converted positional information associated with the player in the video frame.

* * * * *